(12) United States Patent
Smith

(10) Patent No.: US 8,251,043 B2
(45) Date of Patent: Aug. 28, 2012

(54) VARIABLE VALVE LIFT CONTROL SYSTEMS AND METHODS

(75) Inventor: Stuart R. Smith, Howell, MI (US)

(73) Assignee: GM Global Technology Operations LLC

( * ) Notice: Subject to any disclaimer, the term of this patent is extended or adjusted under 35 U.S.C. 154(b) by 377 days.

(21) Appl. No.: 12/652,251

(22) Filed: Jan. 5, 2010

(65) Prior Publication Data

US 2011/0162602 A1 Jul. 7, 2011

(51) Int. Cl.
*F02D 13/00* (2006.01)
(52) U.S. Cl. .................. 123/345; 123/346; 123/90.15
(58) Field of Classification Search .................. 123/321, 123/322, 345, 346, 347, 348, 90.1, 90.15, 123/434

See application file for complete search history.

(56) References Cited

U.S. PATENT DOCUMENTS

| | | | | |
|---|---|---|---|---|
| 7,194,998 B2 * | 3/2007 | Fuwa et al. | | 123/346 |
| 7,520,261 B2 * | 4/2009 | Saruwatari et al. | | 123/305 |
| 7,536,996 B2 * | 5/2009 | Nagai | | 123/435 |
| 8,036,806 B2 * | 10/2011 | Nakamura | | 701/102 |

* cited by examiner

*Primary Examiner* — John Kwon

(57) ABSTRACT

An intake valve control system comprises a torque control module and an opening control module. The torque control module controls torque output by an engine based on a torque output target. The opening control module opens intake valves of M cylinders of the engine to a first lift position when the torque output target is less than a torque threshold and selectively transitions the intake valves of N of the M cylinders to a second lift position. N and M are integers greater than zero, and N is less than M. The second lift position is open further than the first lift position.

18 Claims, 5 Drawing Sheets

VARIABLE VALVE LIFT CONTROL SYSTEMS AND METHODS

FIELD

The present disclosure relates to internal combustion engines and more particularly to variable valve lift control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle includes an internal combustion engine that generates drive torque. An intake valve associated with a cylinder of the engine is selectively opened to draw air into the cylinder. The air mixes with fuel to form an air/fuel mixture that is combusted within the cylinder. An exhaust valve associated with the cylinder selectively opens to allow exhaust gas resulting from combustion to exit the cylinder.

A rotating camshaft regulates the opening and closing of the intake valve and/or exhaust valve. The camshaft includes cam lobes that are fixed to and rotate with the camshaft. The geometric profile of a cam lobe determines a valve lift schedule. More specifically, the geometric profile of a cam lobe controls the period that a valve is open (duration) and the extent or degree to which the valve opens (lift).

Variable valve actuation (VVA) technology improves fuel economy, engine efficiency, and performance by modifying valve lift and duration as a function of engine operating conditions. Two-step VVA systems include variable valve lift mechanisms, such as hydraulically-controlled, switchable roller finger followers (SRFFs). A SRFF associated with a valve (e.g., the intake or exhaust valve) allows the valve to be opened in two discrete lift states: a low lift state and a high lift state. Valve lift is increased during operation in the high lift state.

A control module selectively transitions the SRFF mechanism between the high and low lift states. In other words, the control module controls which camshaft lobe will used to control opening and closing of the associated valve. For example, the control module may transition all of the SRFF mechanisms of the engine to the high lift state when the engine speed is greater than a predetermined speed, such as approximately 4,000 revolutions per minute (rpm).

SUMMARY

An intake valve control system comprises a torque control module and an opening control module. The torque control module controls torque output by an engine based on a torque output target. The opening control module opens intake valves of M cylinders of the engine to a first lift position when the torque output target is less than a torque threshold and selectively transitions the intake valves of N of the M cylinders to a second lift position. N and M are integers greater than zero, and N is less than M. The second lift position is open further than the first lift position.

An intake valve control method comprises controlling torque output by an engine based on a torque output target, opening intake valves of M cylinders of the engine to a first lift position when the torque output target is less than a torque threshold, and selectively transitioning the intake valves of N of the M cylinders to a second lift position. N and M are integers greater than zero, and N is less than M. The second lift position is open further than the first lift position.

Further areas of applicability of the present disclosure will become apparent from the detailed description provided hereinafter. It should be understood that the detailed description and specific examples are intended for purposes of illustration only and are not intended to limit the scope of the disclosure.

DETAILED DESCRIPTION

Figure 1:
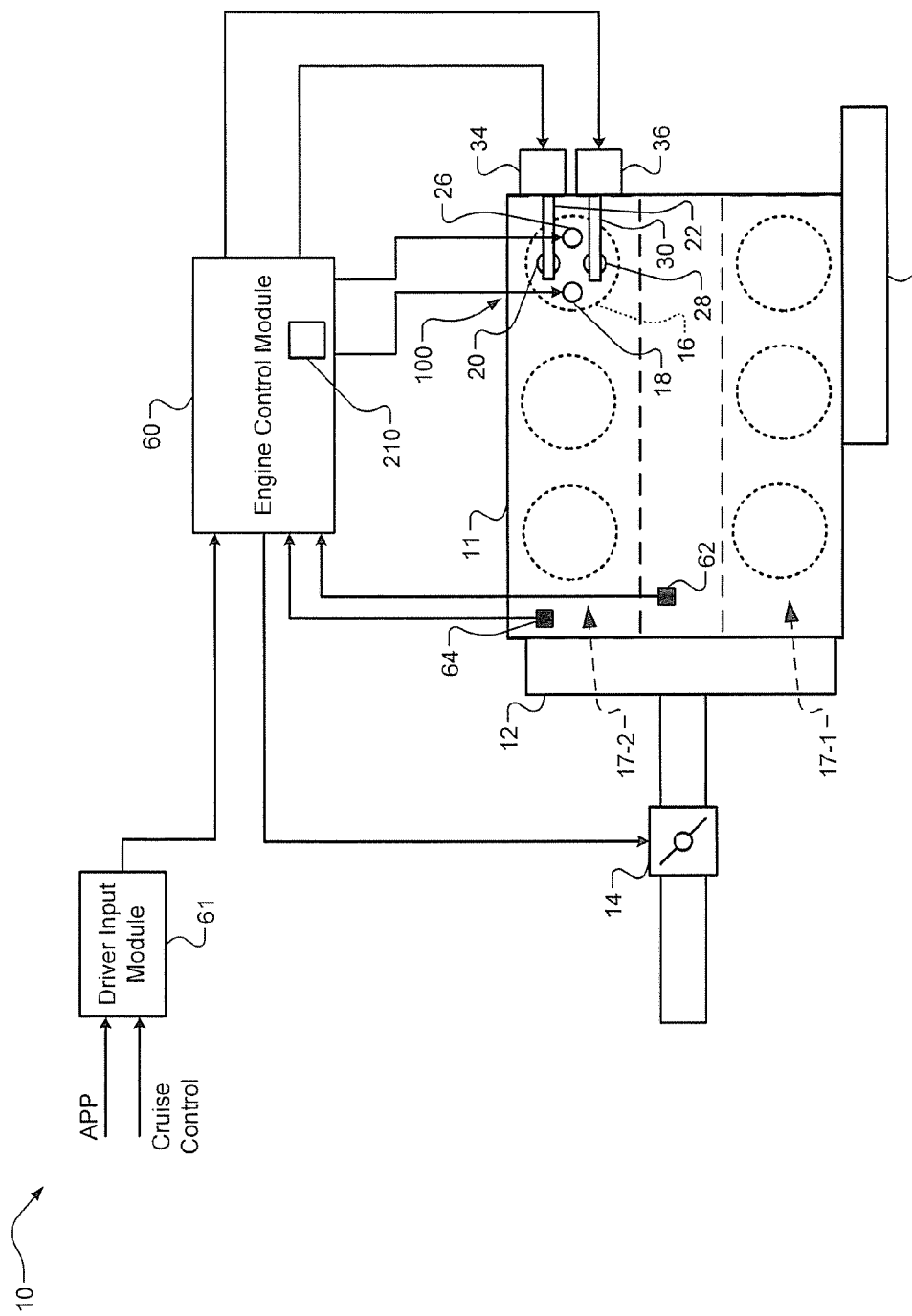
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A lift control module selectively transitions operation of a variable valve lift mechanism between low and high lift states. During low lift operation, the variable valve lift mechanism controls opening and closing of an associated intake valve based on a geometric profile of a low lift cam lobe that rotates with a camshaft. The variable valve lift mechanism controls the opening and closing of the intake valve based on a geometric profile of a high lift cam lobe that rotates with the camshaft during high lift operation.

Generally, the lift control module maintains the variable valve lift mechanisms of each cylinder of an engine in low lift operation. The lift control module transitions all of the cylinders' variable valve lift mechanisms to high lift operation when a target for torque output of the engine is greater than a maximum torque output of the engine during low lift operation.

The lift control module of the present disclosure selectively transitions some, but less than all, of the cylinders' variable valve lift mechanisms to high lift operation when the target for engine torque output is greater than a torque threshold. For example only, the lift control module may transition half of the cylinders' variable valve lift mechanisms to high lift operation when the target is greater than the torque threshold. Transitioning some of the cylinders' intake valves to high lift operation enables the engine to achieve the targeted engine torque output. Transitioning less than all of the cylinders' intake valves to high lift operation minimizes fuel consumption of the engine.

Referring now to FIG. 1, a functional block diagram of an exemplary engine system 10 is presented. The engine system 10 includes an engine 11 that combusts an air/fuel mixture to produce drive torque for a vehicle. Air is drawn into an intake manifold 12 through a throttle 14. The throttle 14 regulates air flow into the intake manifold 12. Air within the intake manifold 12 is drawn into cylinders of the engine 11, such as cylinder 16. While the engine 11 is shown as including six cylinders, the engine 11 may include a greater or fewer number of cylinders including, but not limited to, 1, 2, 3, 4, 5, 8, 10, 12, or 16 cylinders. The cylinders may be grouped in one or more cylinder banks, such as cylinder banks 17-1 and 17-2.

Fuel injectors, such as fuel injector 18, inject fuel that mixes with air to form an air/fuel mixture. In various implementations, one fuel injector may be provided for each of the cylinders of the engine 11. The fuel injectors may be associated with an electronic or mechanical fuel injection system, a jet or port of a carburetor, or another system for providing fuel. The fuel injectors are controlled to provide a desired air/fuel mixture for combustion, such as a stoichiometric air/fuel mixture.

An intake valve 20 opens and closes to allow air into the cylinder 16. Opening and closing of the intake valve 20 is regulated by an intake camshaft 22. A piston (not shown) compresses the air/fuel mixture within the cylinder 16. A spark plug 26 initiates combustion of the air/fuel mixture within the cylinder 16. In some engine systems, such as diesel engine systems, combustion may be initiated without the spark plug 26. Combustion of the air/fuel mixture applies force to the piston, which rotatably drives a crankshaft (not shown).

Exhaust produced by combustion is forced out of the cylinder 16 via an exhaust valve 28. Opening and closing of the exhaust valve 28 is controlled by an exhaust camshaft 30. The exhaust is expelled from the cylinders to an exhaust system 32. The exhaust system 32 treats the exhaust before the exhaust is expelled from the vehicle. Although only one intake and exhaust valve have been described as being associated with the cylinder 16, more than one intake and/or exhaust valve may be associated with each cylinder.

An intake cam phaser 34 and an exhaust cam phaser 36 regulate rotation of the intake and exhaust camshafts 22 and 30, respectively. More specifically, the intake and exhaust cam phasers 34 and 36 control the timing or phase angle of the intake and exhaust camshafts 22 and 30, respectively. For example only, the intake and exhaust cam phasers 34 and 36 may retard or advance rotation of the intake and exhaust camshafts 22 and 30, respectively, with respect to each other, a position of the piston within the cylinder 16, or another suitable point of reference.

In this manner, the intake and exhaust cam phasers 34 and 36 control the position of the intake and exhaust valves 20 and 28, respectively. By regulating the position of the intake valve 20 and/or the exhaust valve 28, the intake and exhaust cam phasers 34 and 36 control the quantity and of air drawn into the cylinder 16. The amount of fuel injected for combustion is controlled based on the amount of air within the cylinder 16. For example only, fuel may be provided to achieve a stoichiometric air/fuel mixture.

Figure 2:
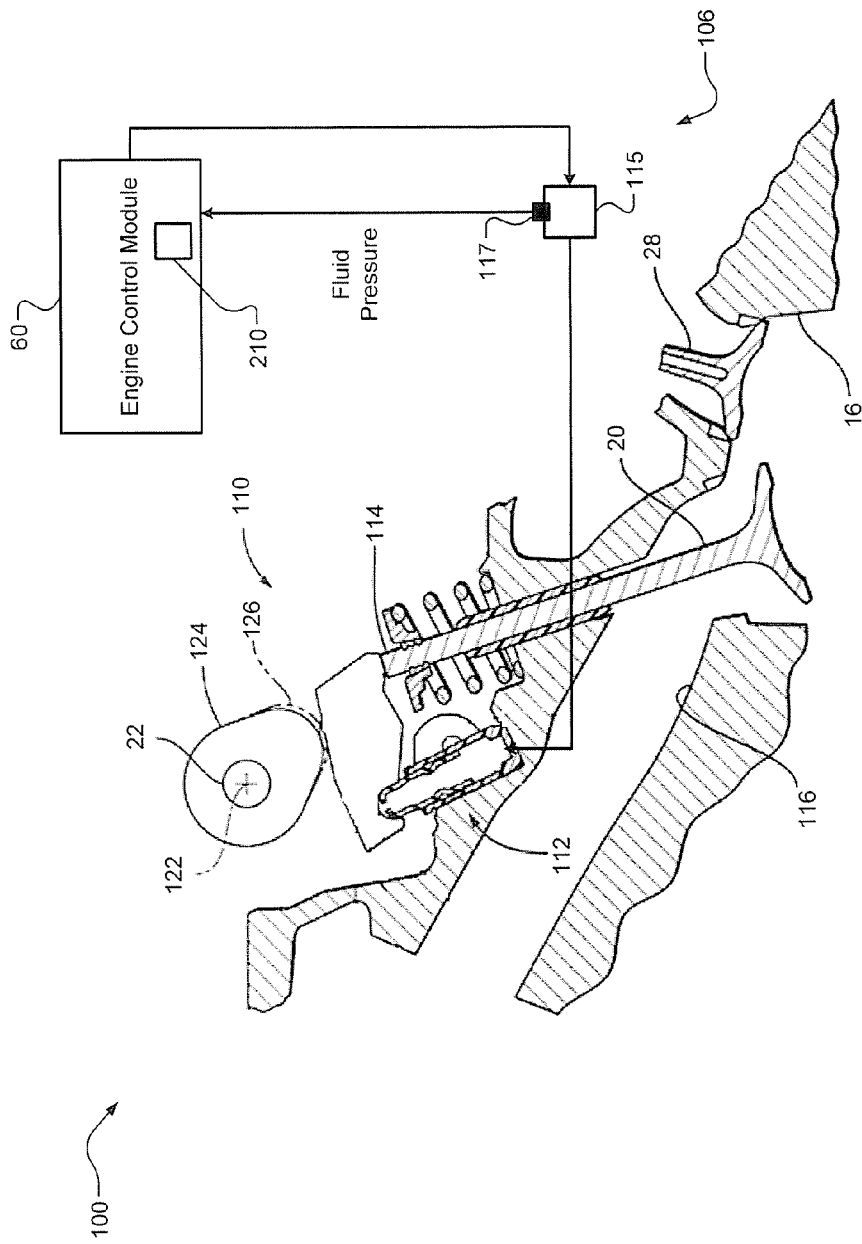
FIG. 2 is a cross sectional view of an intake valve system and a flowchart depicting an exemplary lift control system according to the principles of the present disclosure.

FIG. 2 is a cross sectional view of an exemplary intake valve system 100 that is associated with the cylinder 16. FIG. 2 also includes a block diagram depicting an exemplary lift control system 106 for the intake valve system 100. The intake valve system 100 includes a variable valve lift mechanism 110, such as a switching roller finger follower (SRFF) or another suitable type of valve lift mechanism that enables an associated valve to be lifted to more than one lift position. The variable valve lift mechanism 110 is associated with the intake valve 20 and enables opening of the intake valve 20 to two different lift positions: a high lift position and a low lift position.

The variable valve lift mechanism 110 is pivotally mounted on a hydraulic lash adjuster 112, and the variable valve lift mechanism 110 contacts a valve stem 114 of the intake valve 20. A fluid control valve 115 supplies fluid to the lash adjuster 112 to control the height of the lash adjuster 112. For example only, the fluid control valve 115 may include an oil control valve (OCV) that controls pressure of an oil supplied to the lash adjuster 112. A fluid pressure sensor 117 measures pressure of the fluid supplied by the fluid control valve 115 and generates a fluid pressure signal accordingly.

In some implementations, the fluid control valve 115 may also supply the fluid to other lash adjusters. For example only, the fluid control valve 115 may supply the fluid to lash adjusters associated with the other cylinders of the cylinder bank 17-2, the cylinder bank that includes the cylinder 16. In such implementations, another fluid control valve (not shown) may supply the fluid to lash adjusters associated with cylinders in the other cylinder bank 17-1. In other implementations, one fluid control valve may be provided for each lash adjuster.

The intake camshaft 22 rotates about a camshaft axis 122. Low lift cam lobes (e.g., low lift cam lobe 124) and high lift cam lobes (e.g., high lift cam lobe 126) are mounted to the intake camshaft 22. One low lift cam lobe and one high lift cam lobe may be provided on the intake camshaft 22 for each intake valve. For example only, the low lift cam lobe 124 and the high lift cam lobe 126 are provided for the intake valve 20 of the cylinder 16.

The low and high lift cam lobes rotate with the intake camshaft 22. The intake valve 20 selectively opens and closes an inlet passage 116. Air flows into the cylinder 16 when the inlet passage 116 is open. The intake valve 20 is selectively opened and closed by the low or high lift cam lobe 124 or 126. The variable valve lift mechanism 110 allows the intake valve 20 to be lifted (i.e., opened) to the low lift position or the high lift position.

During low lift operation, the low lift cam lobe 124 causes the variable valve lift mechanism 110 to pivot in accordance with the geometry of the low lift cam lobe 124. The pivoting of the variable valve lift mechanism 110 caused by the low lift cam lobe 124 opens the intake valve 20 to the low lift position.

During high lift operation, the high lift cam lobe 126 causes the variable valve lift mechanism 110 to pivot to a high lift position in accordance with the geometry of the high lift cam lobe 126. The pivoting of the variable valve lift mechanism 110 caused by the high lift cam lobe 126 opens the intake valve 20 to the high lift position. When opened to the high lift position, the intake valve 20 is open further than when it is opened to the low lift position.

The pressure of the fluid supplied by the fluid control valve 115 controls which one of the low lift cam lobe 124 and the high lift cam lobe 126 opens and closes the intake valve 20. More specifically, the pressure of the fluid controls the height of the lash adjuster 112. In this manner, the fluid control valve 115 controls the operation of the intake valve 20. For example only, the fluid control valve 115 may supply fluid at a lower predetermined pressure (e.g., approximately 10 psi) and a higher predetermined pressure (e.g., approximately 25 psi) to achieve low lift operation and high lift operation, respectively.

The fluid control valve 115 controls the fluid pressure based on signals from an engine control module (ECM) 60. In this manner, the ECM 60 controls the fluid pressure and, therefore, lift. The ECM 60 also controls engine parameters, such as intake and exhaust cam phaser angles, opening of the throttle 14, amount of fuel injected, timing of fuel injection, spark timing, and/or other suitable engine parameters.

The ECM 60 selectively makes control decisions for the engine system 10 based on various inputs and measured parameters. The inputs may include, for example, driver inputs and inputs from various vehicle systems. A driver input module 61 provides the driver inputs to the ECM 60. The driver input module 61 may generate the driver input based on, for example, an accelerator pedal position (APP), a cruise control input, and/or other suitable driver inputs. The vehicle systems may include, for example, a transmission system, a hybrid control system (e.g., for controlling one or more electric motors), a stability control system, a chassis control system, and/or other suitable vehicle systems.

A crankshaft sensor 62 measures the position of the crankshaft and outputs the crankshaft position signal accordingly. For example only, the crankshaft sensor 62 may include a variable reluctance (VR) sensor or another suitable type of crankshaft sensor. The crankshaft position signal may include a pulse train. Each pulse of the pulse train may be generated as a tooth of an N-toothed wheel (not shown) that rotates with the crankshaft, passes the VR sensor. Accordingly, each pulse corresponds to an angular rotation of the crankshaft by an amount equal to 360° divided by N teeth. The N-toothed wheel may also include a gap of one or more missing teeth, and the gap may be used as an indicator of one complete rotation of the crankshaft.

The ECM 60 receives the crankshaft position measured by the crankshaft sensor 62. The ECM 60 may also receive parameters measured by other sensors 64, such as oxygen in the exhaust system 32, engine coolant temperature, intake air temperature, mass airflow, oil temperature, manifold absolute pressure, and/or other suitable engine parameters.

The ECM 60 determines torque output request for the engine 11 (i.e., a target for engine torque output) based on the driver inputs and the inputs from other vehicle systems. The ECM 60 controls the torque output of the engine 11 based on the torque output request. The ECM 60 also controls the operation of the intake valves of the cylinders. The ECM 60 generally maintains the intake valves of all of the cylinders in low lift operation when the engine torque request is low. The ECM 60 transitions all of the intake valves to high lift operation when additional engine torque output is needed to meet the torque output request.

The ECM 60 of the present disclosure includes a lift control module 210 (See FIG. 3) that selectively transitions some, but less than all, of the cylinders' intake valves to the high lift operation. More specifically, the lift control module 210 transitions some of the cylinders' intake valves to high lift operation when the torque output request is greater than a torque threshold during low lift operation. In some implementations, the lift control module 210 may transition half of the cylinders' intake valves to high lift operation. Transitioning some of the cylinders' intake valves to high lift operation enables the engine 11 to meet the torque output request. Transitioning less than all of the cylinders' intake valves to high lift operation minimizes fuel consumption of the engine 11.

Figure 3:
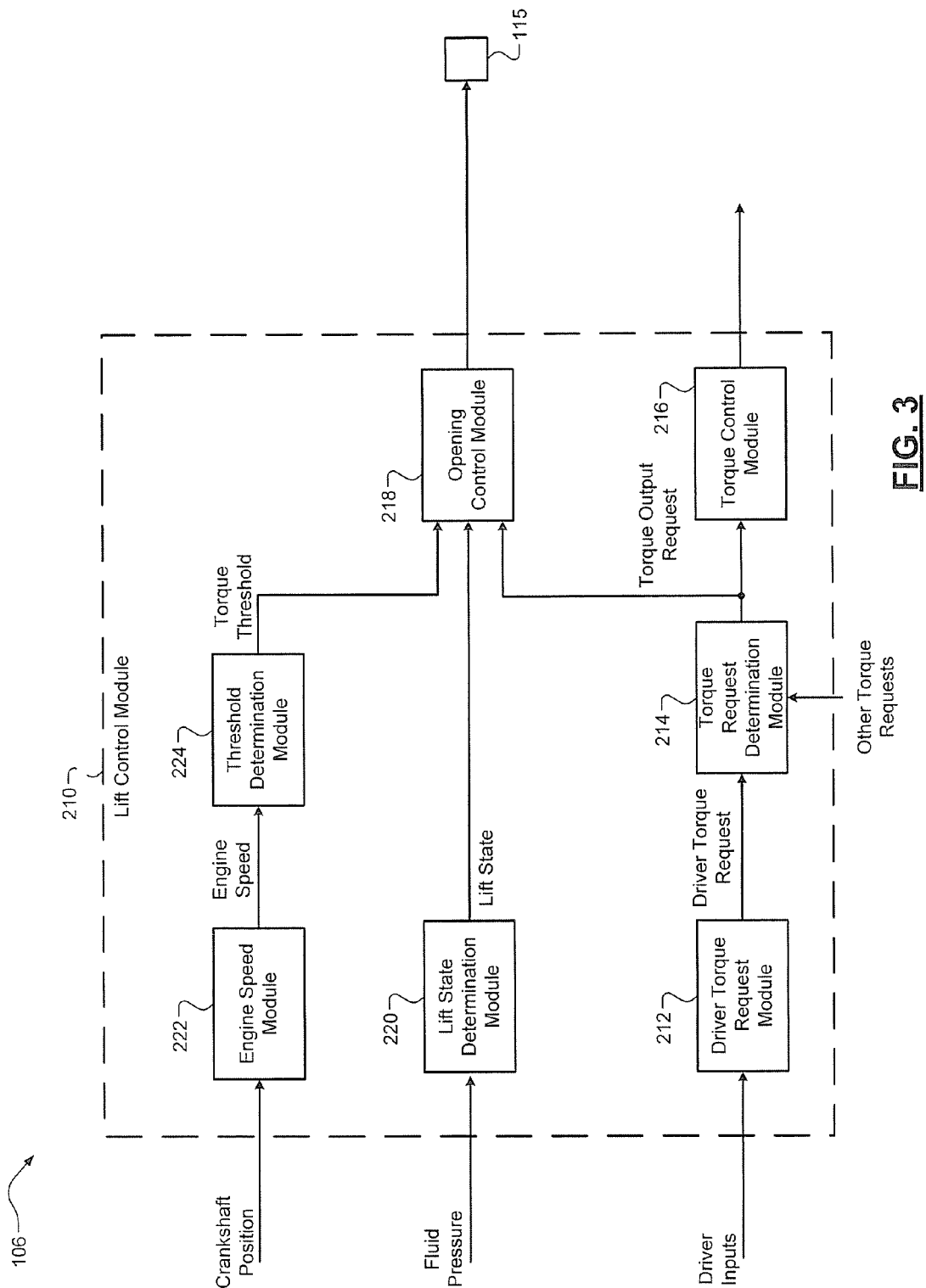
FIG. 3 is a functional block diagram of an exemplary lift control module according to the principles of the present disclosure.

Referring now to FIG. 3, a functional block diagram of an exemplary implementation of the lift control module 210 is presented. The lift control module 210 includes a driver torque request module 212, a torque request determination module 214, and a torque control module 216. The lift control module 210 also includes an opening control module 218, a lift state determination module 220, an engine speed module 222, and a threshold determination module 224.

The driver torque request module 212 determines a driver torque request based on the driver inputs. The driver torque request corresponds to an amount of engine torque output requested by a driver of the vehicle. The driver torque request may also be determined based on other parameters, such as cruise control inputs, vehicle speed, engine speed, current gear ratio selected within a transmission (not shown), and/or other suitable parameters.

The torque request determination module 214 determines the torque output request (i.e., the target for engine torque output) for the engine 11 based on the driver torque request and other torque requests. The torque control module 216 controls the torque output of the engine 11 according to the torque output request. For example only, the torque control module 216 may control the engine operating parameters to achieve the torque output request.

The other torque requests may include, for example, a torque reduction requested during wheel slip by a traction control system, a torque request increase to counteract negative wheel slip, and/or a torque reduction requested to ensure that the engine torque output does not exceed the ability of brakes to hold the vehicle when the vehicle is stopped. The other torque requests may also include torque requests made by stability control systems, torque reduction requests to offset increases in torque provided by electric motors, and/or torque increases for stall prevention. The other torque requests may also include torque reductions requested to accommodate gear shifts, torque reductions requested to reduce the engine torque output when the driver depresses the clutch pedal in a manual transmission vehicle, and/or torque reductions requested to prevent the vehicle from exceeding a predetermined speed.

The opening control module 218 controls opening of intake valves of the engine 11 in high lift operation or low lift operation. The opening control module 218 controls the operation of the intake valves by controlling the pressure of the fluid supplied to the associated lash adjusters. For example only, the opening control module 218 controls the operation of the intake valve 20 by controlling the pressure of fluid supplied to the lash adjuster 112. The opening control module 218 selects high or low lift operation based on the torque output request.

During low lift operation, the opening control module 218 according to the present disclosure selectively transitions some, but less than all, of the cylinders' intake valves to high lift operation. More specifically, the opening control module 218 transitions some of the cylinders' intake valves to high lift operation when the torque output request is greater than a torque threshold during low lift operation. For example only, the opening control module 218 may transition half of the total number of cylinders' intake valves to high lift operation. The intake valves transitioned to high lift operation may be of cylinders of a predetermined cylinder bank (e.g., cylinder bank 17-1 or 17-2) or predetermined cylinders in a firing order (e.g., cylinders 1, 3, 5, and 7 or 2, 4, 6, and 8 in an eight cylinder engine). In some implementations, the opening control module 218 may determine how many cylinders to transition the associated intake valves to high lift operation based on, for example, a difference between the torque output request and the torque threshold.

The lift state determination module 220 indicates whether the intake valves are undergoing low lift operation. The lift state determination module 220 may determine whether the intake valves are undergoing low lift operation based on, for example, the fluid pressure measured by the fluid pressure sensor 117. For example only, the lift state determination module 220 may deem the intake valves to be undergoing low lift operation when the fluid pressure is approximately equal to the lower predetermined pressure. In some implementations, a function of the fluid pressure may be used in determining the operation of the intake valves, such as an average of the fluid pressure over a period of time.

The engine speed module 222 determines the rotational speed of the engine 11 (i.e., the engine speed) in revolutions per minute (rpm). In one implementation, the engine speed module 222 determines the engine speed based on the crankshaft position provided by the crankshaft sensor 62 and/or another suitable measure of the engine speed. For example only, the engine speed module 222 may determine the engine speed based on the period of time between the pulses of the pulse train output by the crankshaft sensor 62.

The threshold determination module 224 determines the torque threshold for transitioning some of the intake valves to high lift operation and supplies the torque threshold to the opening control module 218. The threshold determination module 224 determines the torque threshold based on the engine speed during low lift operation. For example only, the threshold determination module 224 may determine the torque threshold from a mapping of torque thresholds indexed by engine speed. The torque thresholds may each correspond to a maximum torque output of the engine 11 at that engine speed during low lift operation.

The opening control module 218 transitions the some of the cylinders' intake valves to high lift operation when the torque output request is greater than the torque threshold during low lift operation. By transitioning the some of the cylinders' intake valves to high lift operation, the lift control module 210 enables the engine 11 to achieve the torque output request. Transitioning less than all of the cylinders' intake valves to high lift operation simultaneously minimizes fuel consumption as the remainder of the cylinders' intake valves are maintained in low lift operation and require less fuel to achieve a stoichiometric air/fuel mixture.

Figure 4A:
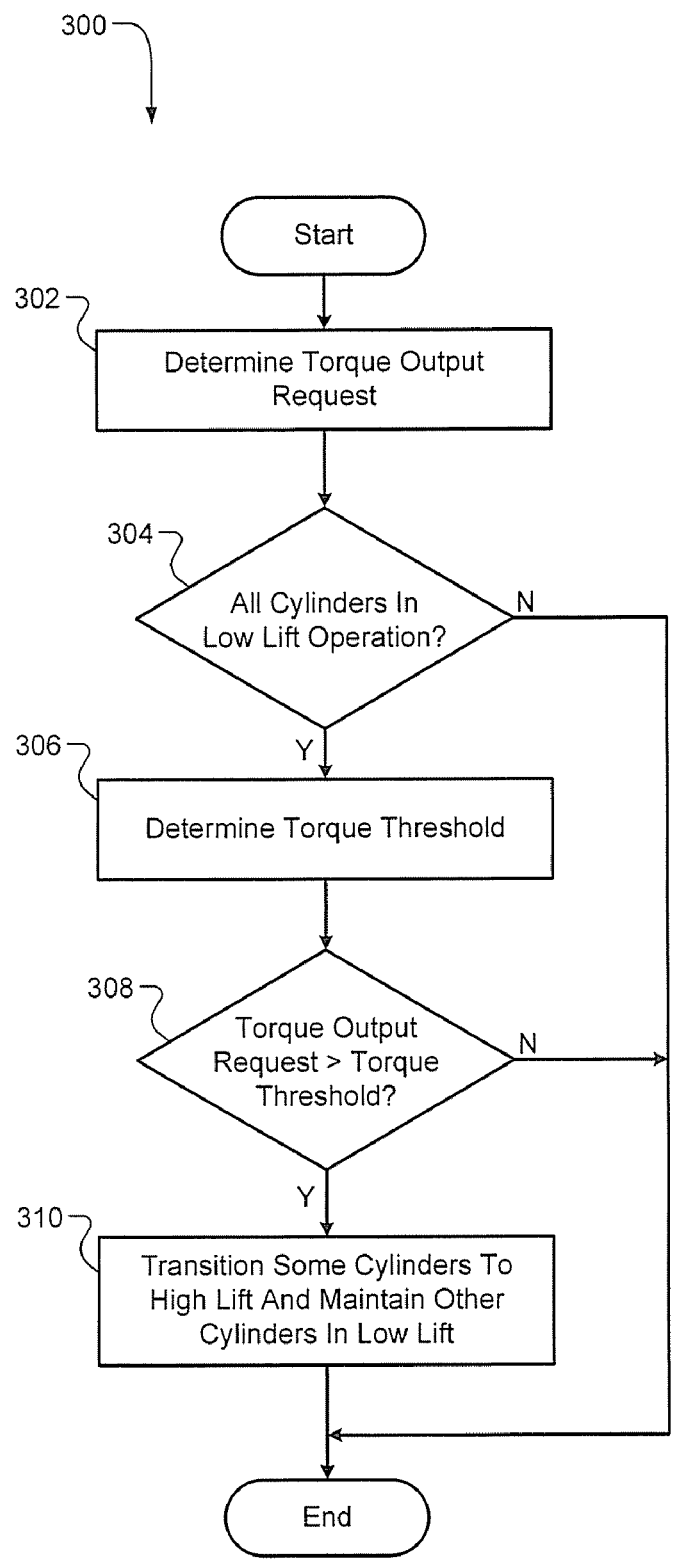
FIGS. 4A-4B are flowcharts depicting exemplary steps performed by methods according to the principles of the present disclosure.

Referring now to FIG. 4A, a flowchart depicting exemplary steps performed by a method 300 is presented. The method 300 determines the torque output request in step 302 and determines whether all of the cylinders' intake valves are currently undergoing low lift operation in step 304. If true, the method 300 continues to step 306; if false, the method 300 ends. The method 300 may determine whether the intake valves are undergoing low lift operation based on, for example, the fluid pressure of the fluid supplied to the associated lash adjusters.

The method 300 determines the torque threshold in step 306 and continues to step 308. The method 300 determines whether the torque output request is greater than the torque threshold in step 308. If false, the method 300 ends; if true, the method 300 transitions some of the cylinders' intake valves to high lift operation in step 310. The method 300 also maintains the remainder of the cylinders' intake valves in low lift operation in 310. For example only, the method 300 may transition half of the cylinders' intake valves to high lift operation. The method 300 then ends.

Figure 4B:
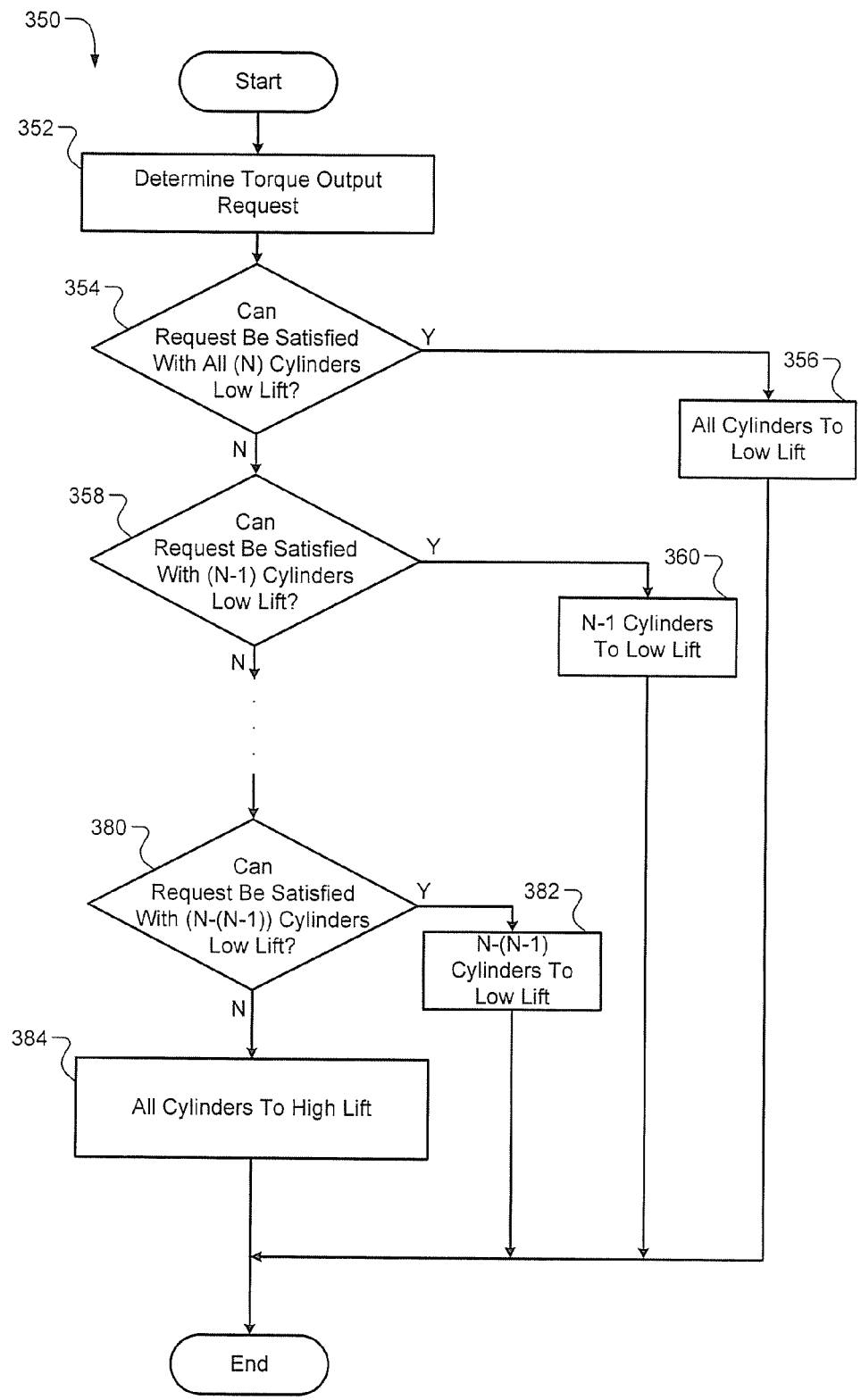

Referring now to FIG. 4B, a flowchart depicting exemplary steps performed by a method 350 is presented. The method 350 determines the torque output request in step 352 and determines whether the torque output request can be satisfied with all (i.e., N) of the cylinders' intake valves in low lift operation in step 354. If true, the method 350 transitions all of the N cylinders' intake valve to low lift operation in step 356, and the method 350 ends. If false, the method 350 continues to step 358.

In step 358, the method 350 determines whether the torque output request can be satisfied with all but one (i.e., N−1) of the N cylinders' intake valves in low lift operation. If true, the method 350 transitions the N−1 cylinder's intake valves to low lift operation in step 360, and the method 350 ends. If false, the method 350 proceeds. More specifically, the method 350 continues to determine whether the torque output request can be satisfied with one less cylinders' intake valves in low lift operation. If true, the method 350 transitions that many cylinders' intake valves to low lift operation. The method 350 may continue this iterative process until the method 350 reaches step 380.

In step 380, the method 350 determines whether the torque output request can be satisfied with one of the N cylinders' (i.e., N−(N−1)) intake valves in low lift operation. If true, the method 350 transitions one of the N cylinders to low lift operation in step 382, and the method 350 ends. If false, the method 350 maintains all of the N cylinders' intake valves in high lift operation in step 384, and the method 350 ends.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An intake valve control system comprising:
a torque control module that controls torque output by an engine based on a torque output target; and
an opening control module that opens intake valves of M cylinders of the engine to a first lift position when the torque output target is less than a torque threshold and that selectively transitions the intake valves of N of the M cylinders to a second lift position,
wherein N and M are integers greater than zero and N is less than M, and
wherein the second lift position is open further than the first lift position.

2. The intake valve control system of claim 1 wherein N is equal to one-half of M.

3. The intake valve control system of claim 1 wherein N corresponds to one bank of the M cylinders.

4. The intake valve control system of claim 1 wherein the N cylinders are selected from a predetermined firing order of the M cylinders.

5. The intake valve control system of claim 1 wherein the opening control module transitions the intake valves of the N cylinders to opening to the second lift position when the torque output target is greater than the torque threshold.

6. The intake valve control system of claim 1 further comprising a threshold determination module that determines the torque threshold based on a speed of the engine.

7. The intake valve control system of claim 1 further comprising a lift state determination module that indicates when the intake valves of the M cylinders are being opened to the first lift position based on first and second pressures of fluid supplied by first and second fluid control valves, respectively.

8. The intake valve control system of claim 7 wherein the lift state determination module indicates that the intake valves of the M cylinders are being opened to the first lift position when the first and second pressures are approximately equal to a first predetermined pressure.

9. A system comprising:
the intake valve control system of claim 8; and
the first and second fluid control valves,
wherein the first fluid control valve supplies the fluid to variable valve lift mechanisms associated with the N cylinders,
wherein the opening control module increases the first pressure to a second predetermined pressure when the torque output target is greater than the torque threshold, and
wherein the second predetermined pressure is greater than the first predetermined pressure.

10. An intake valve control method comprising:
a controlling torque output by an engine based on a torque output target;
opening intake valves of M cylinders of the engine to a first lift position when the torque output target is less than a torque threshold; and
selectively transitioning the intake valves of N of the M cylinders to a second lift position,
wherein N and M are integers greater than zero and N is less than M, and
wherein the second lift position is open further than the first lift position.

11. The intake valve control method of claim 10 wherein N is equal to one-half of M.

12. The intake valve control method of claim 10 wherein N corresponds to one bank of the M cylinders.

13. The intake valve control method of claim 10 wherein the N cylinders are selected from a predetermined firing order of the M cylinders.

14. The intake valve control method of claim 10 further comprising transitioning the intake valves of the N cylinders to opening to the second lift position when the torque output target is greater than the torque threshold.

15. The intake valve control method of claim 10 further comprising determining the torque threshold based on a speed of the engine.

16. The intake valve control method of claim 10 further comprising indicating when the intake valves of the M cylinders are being opened to the first lift position based on first and second pressures of fluid supplied by first and second fluid control valves, respectively.

17. The intake valve control method of claim 16 further comprising indicating that the intake valves of the M cylinders are being opened to the first lift position when the first and second pressures are approximately equal to a first predetermined pressure.

18. The intake valve control method of claim 17 further comprising:
supplying the fluid to variable valve lift mechanisms associated with the N cylinders using the first and second control valves; and
increasing the first pressure to a second predetermined pressure when the torque output target is greater than the torque threshold,
wherein the second predetermined pressure is greater than the first predetermined pressure.

* * * * *